(12) United States Patent
Scribner

(10) Patent No.: US 10,706,425 B2
(45) Date of Patent: Jul. 7, 2020

(54) SYSTEM AND METHOD FOR RECOGNIZING AND GENERATING CONSISTENT IDENTIFICATION KEYS

(71) Applicant: Craig Douglas Scribner, Orem, UT (US)

(72) Inventor: Craig Douglas Scribner, Orem, UT (US)

(73) Assignee: Claravine, Provo, UT (US)

( * ) Notice: Subject to any disclaimer, the term of this patent is extended or adjusted under 35 U.S.C. 154(b) by 491 days.

(21) Appl. No.: 15/692,390

(22) Filed: Aug. 31, 2017

(65) Prior Publication Data

US 2017/0364921 A1 Dec. 21, 2017

Related U.S. Application Data

(63) Continuation of application No. 14/487,619, filed on Sep. 16, 2014, now abandoned.

(60) Provisional application No. 61/878,754, filed on Sep. 17, 2013.

(51) Int. Cl.
*G06Q 30/00* (2012.01)
*G06F 16/9535* (2019.01)

(52) U.S. Cl.
CPC ......... *G06Q 30/00* (2013.01); *G06F 16/9535* (2019.01)

(58) Field of Classification Search
CPC ........................... G06Q 30/00; G06F 16/9535

USPC ........................................................ 707/691
See application file for complete search history.

(56) References Cited

U.S. PATENT DOCUMENTS

| 2006/0224995 A1* | 10/2006 | Treibach-Heck ..... G06F 3/0482 715/816 |
| 2007/0239692 A1* | 10/2007 | McBride ............... G06F 16/951 |
| 2008/0189279 A1* | 8/2008 | Mayer ................. G06F 16/2468 |
| 2009/0006392 A1* | 1/2009 | Chen ................... G06F 16/2462 |
| 2012/0209834 A1* | 8/2012 | Vailaya ................. G06F 16/334 707/723 |
| 2014/0201229 A1* | 7/2014 | Kirazci ............... G06F 16/3323 707/767 |
| 2015/0025909 A1* | 1/2015 | Hayter, II ............. G06F 19/321 705/3 |

* cited by examiner

*Primary Examiner* — Pierre M Vital
*Assistant Examiner* — Alicia M Antoine
(74) *Attorney, Agent, or Firm* — Ascentage Patent Law, LLC; Travis Lee Johnson

(57) ABSTRACT

The present invention seeks to offer a system and method for recognizing patterns in key value identifier strings and seeks to provide a method for generating new unique key value identifier strings which follow pre-established patterns allowing users to keep a uniform format and simplify the future generation of key value identifiers.

1 Claim, 6 Drawing Sheets

FIG. 3

List:

S|Ban|2393
S|Ban|2349
C|Ban|3045
S|Ban|2294
S|Ban|2255
se.emea.test39
C|SOC|FCB|2242
C|Ban|3007
S|Ban|2298
S|Ban|2236
S|P-G|2683
C|Ban|2778
S|Ban|2400
S|Ban|2267
C|Ban|2869
S|Ban|2280
qyzTest3
C|Ban|2917
S|Ban|2387
C|Ban|2997
S|P-G|2659
S|P-G|2665
se.emea.test40

Components:

*|Ban|* (16 instances)
S|* (13 instances)
C|* (7 instances)
S|P-G|* (3 instances)
se.emea.test (w instances)

Templates:

S|Ban|[Auto#]
C|Ban|[Auto#]
S|P-G|[Auto#]
se.emea.test[Auto#]

FIG. 5

| KEY | Campaign Name | Media Type | Business Type | Email Vendor | Details | Social Media Site | Banner Ad Size | Placement Site |
|---|---|---|---|---|---|---|---|---|
| C\|Ban\|3007 | Spring Blitz 2013 | Banner Ad | Consumer | | Double Take | | Rectangle (300x100) | espn.go.com |
| C\|Ban\|3045 | Spring Blitz 2013 | Banner Ad | Consumer | | Gray Angle | | Micro Bar (88x31) | sports.yahoo.com |
| S\|Ban\|2255 | Spring Blitz 2013 | Banner Ad | SMB | | Well Defined | | Button 1 (120x90) | amazon.com |
| S\|Ban\|2294 | Spring Blitz 2013 | Banner Ad | SMB | | Well Defined | | Half Banner (234x60) | amazon.com |
| S\|Ban\|2298 | Summer Blitz 2013 | Banner Ad | SMB | | Bright Ideas | | Button 1 (120x90) | cnn.com |
| S\|Ban\|2349 | Summer Blitz 2013 | Banner Ad | SMB | | Well Defined | | Rectabgke (300x100) | freetetris.org |
| S\|Ban\|2393 | Summer Blitz 2013 | Banner Ad | SMB | | Bright Ideas | | Micro Bar (88x31) | freetetris.org |

| Banner Ad Size | Banner Ad Placement Site | Landing Page |
|---|---|---|

Leaderboard (728x90)
Rectangle (180x150)
Vertical Banner (120x240)
Wide Skyscraper (160x600)
Square Pop-up (250x250)
Square Button (125x125)
Vertical Rectangle (240x400)
Pop-Under (720x300)

400, 410

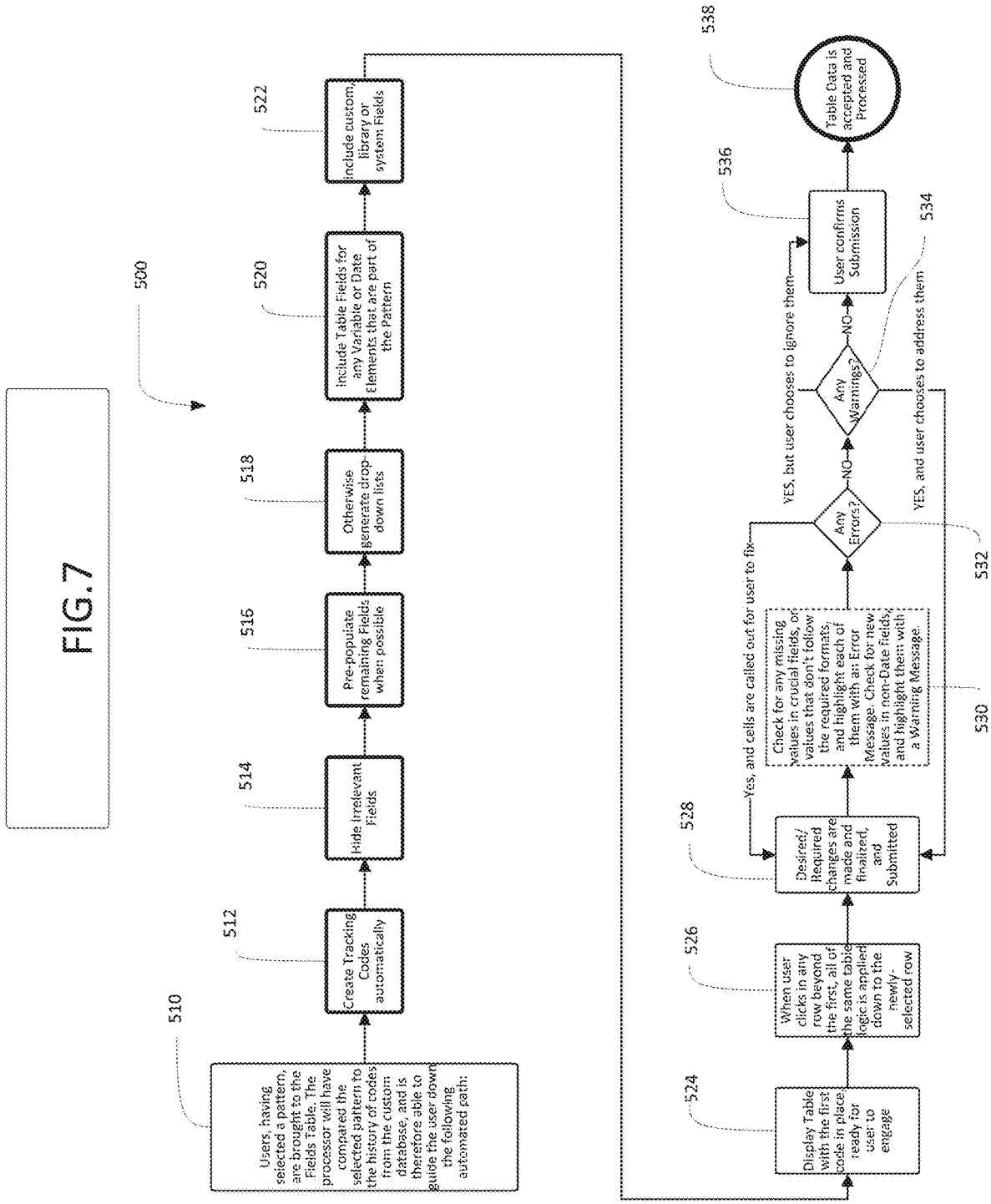

SYSTEM AND METHOD FOR RECOGNIZING AND GENERATING CONSISTENT IDENTIFICATION KEYS

PRIORITY CLAIMS

This patent application claims the benefit of U.S. Utility patent application Ser. No. 14/487,619 which was file on Sep. 16, 2014, which claims priority to provisional application No. 61/878,754 filed on Sep. 17, 2013, both of which are herein incorporated by reference in their entirety.

COPYRIGHT STATEMENT

A portion of the disclosure of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND

1. Field of the Invention

The disclosure relates to methods and device for creating links to landing websites which have key identification codes embedded therein for use in gathering information which may be of importance to web analysts.

2. Description of the Prior Art

There are various web analytics software programs presently used in the marketplace that are capable of recognizing where and how an end user was directed to a particular website and tracking this specific user's activity on the website after arriving, examples of such programs include, but are not limited to, Adobe Omniture® and Google Analytics®. These programs run scripts on a website that can determine various methods or avenues users might have utilized to gain access to a website. Both Adobe Omniture® and Google Analytics® utilize key codes embedded in the address used to access a website in order to determine how a particular user gained access to the website. As such, unique key codes can be generated and provided within the links to a company's website within particular banner advertisements, promotional emails, search ads provided by search engines, etc. These unique key codes can be recognized by the scripts of the target website and the user's activity can then be tracked so as to provide information to the company regarding which promotions or advertisements are more effective than others. Such effectiveness can include information regarding whether more people visit the website due to certain types of advertisements, or whether certain types of ads are more likely to create a buying customer whereas alternative types of advertisements might only cause a user to visit and leave without a purchase. There are many types of information that could potentially be tracked and recorded by assigning these custom key codes to the various links located within ads, or on the target webpage itself. Unfortunately, the recognition of these key codes can be inhibited by errors in formulating the codes. Alternatively, syntax errors within the codes can cause errors which limit the web analytics software from tracking the behavior of the persons visiting the website. Such errors often corrupt any information gathered and thus render information represented by the key codes impossible to recognize or otherwise useless.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 illustrates another exemplary embodiment of a procedural decision diagram which illustrates steps to achieve additional steps of the method as depicted in FIG. 2;

FIG. 5 illustrates an exemplary embodiment of a more complex customized database;

FIG. 6 illustrates an exemplary embodiment of one method of showing potential future selections for a particular key component within an exemplary possible field array; and FIG. 7 illustrates a schematic of an exemplary embodiment showing a decision tree correlating to how a user would generate a key value using methods and systems in accordance with one aspect of the present invention Reference will now be made to the exemplary embodiments illustrated, and specific language will be used herein to describe the same. It will nevertheless be understood that no limitation of the scope of the invention is thereby intended.

DETAILED DESCRIPTION

Figure 1:
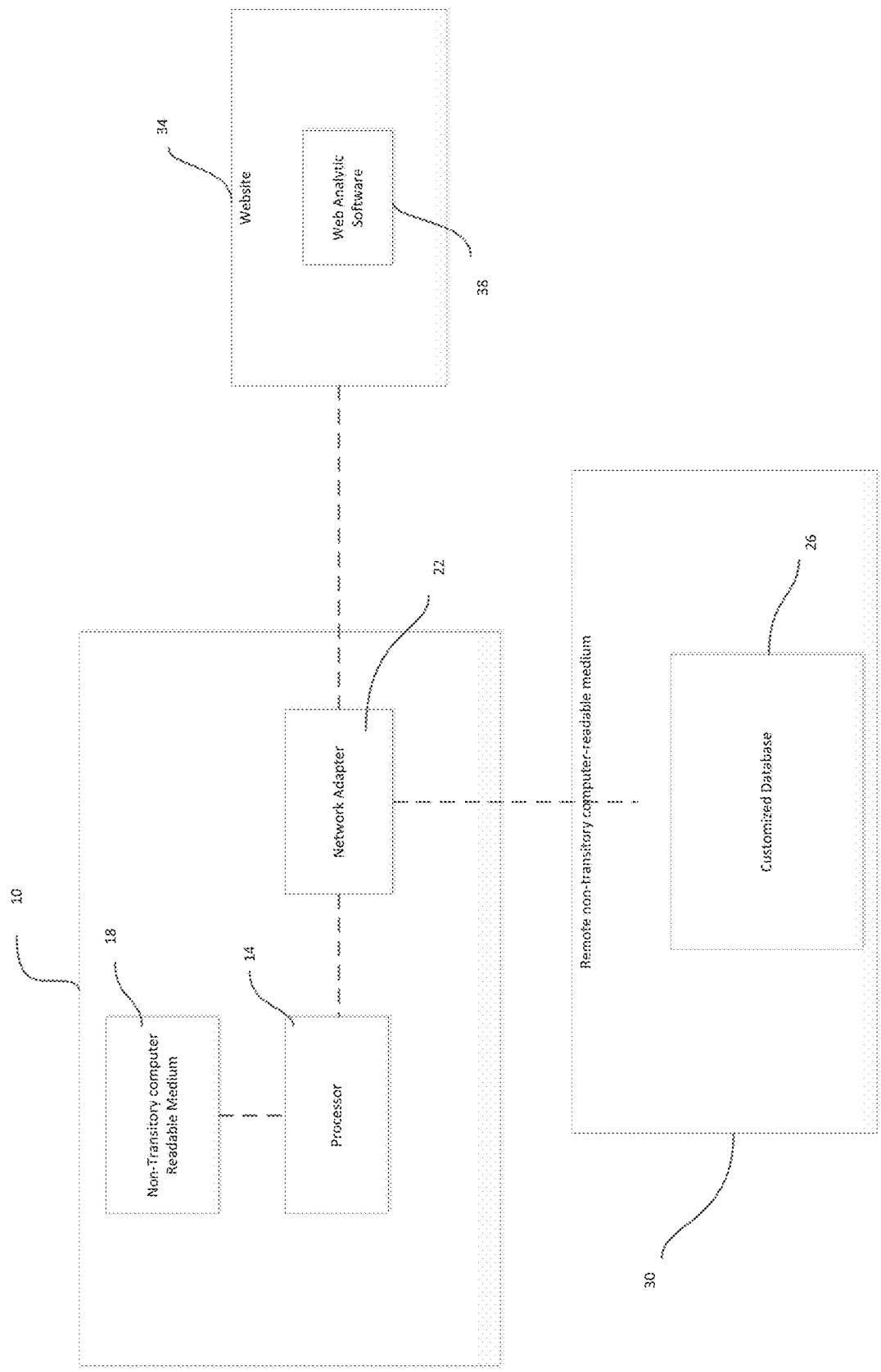
FIG. 1 is a diagram depicting the various components of the system.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity can, in some cases, depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

As discussed above web analytic software can be used in order to detect an avenue by which a user was directed to a website. Such analytic software can then assign a unique identifier to a specific user and thereby track a user's activity.

After gaining access to a website via a particular avenue. For example the user might click on an advertisement on a popular website, the target website recognizes, via a script running on the webpage, which avenue the user used to gain access to the website. The user is then tracked, and if the user continues to purchase a product or service provided on the website, such information can be recorded and analyzed to determine the effectiveness of certain avenues over others. For example, users which click on an advertisement from a social media website might continue on to purchase half as often as users who click on link embedded in a subscriber email catalog. The tracking of this information is possible through web analytic software such as Adobe Omniture™ or Google Analytics™, in conjunction with unique key value identifiers embedded in the web address link used to direct the user to the target website. Often some sort of cookie can be saved on the user's computer, such that if the user decides to return at a later date in order to purchase products or services, that person can be later identified with a particular key value identifier, and linked back to an appropriate access avenue even should the user later directly type a target address into a web address bar, without the key value identifier.

It will be appreciated that the ability to track individual users and determine effectiveness of certain advertising programs over others would greatly increase the overall effectiveness of advertisement funding for future programs and allow companies to more effectively target and advertise to those users most likely to purchase the companies given products or services. It will be appreciated that each key value is made up of a plurality of key components, each key component being associated with a particular piece of data which the company wishes to track.

One large problem in the current state of web analytics is that the key values are often individually created by web analysts of the companies seeking to track a given data marker. These web analysts are typically human users, and as such when generating complex key identifiers using symbols, letters, numbers, or any number of computer-readable characters of increasing complexity often results in key value errors which render the code unreadable or unrecognizable by the web analytic software for which they are written. It will be appreciated by those skilled in the art that such key value identifier strings can get extremely long and complex, wherein the increased length and complexity only increases the chances of presenting an error. Current statistics show that the information tracked by these key identifier values is lost prior to reporting, being estimated up to somewhere between 60-80% of the time. This losing of information can result from the user introducing some sort of typographical error into the identifier string, or introducing a typographical error into the script looking for specific key values, inadvertently duplicating a key value, or any other number of errors which will be recognized by one of ordinary skill in the art.

Some solutions to the present key value identifier errors involves the use of a computer program to generate lengthy and randomly generated identifier strings for each individual key value identifier string. However, randomly generated key value identifier strings are extremely difficult to problem solve should a reading error be found because they do not follow a pre-determined key value identifier value pattern or format. It will be appreciated that finding an error in a random string is far more difficult that finding an error in an established pattern.

As such, the present invention seeks to offer a system and method for recognizing patterns in key value identifier strings and seeks to provide a method for generating new unique key value identifier strings which follow pre-established patterns allowing users to keep a uniform format and simplify the future generation of key value identifiers.

As discussed briefly above, FIG. 1 illustrates one embodiment of a system for recognizing and generating consistent identification keys. The system can include a computer 10, the computer including at least a processor 14, a second non-transitory computer-readable medium 18, and being operably connected to an internal or external network adapter 22. The second non-transitory computer-readable medium can contain at least one executable set of computer instructions capable of detecting patterns within text strings. The network adapter 22 can be capable of accessing the internet, a server, or some other network location. The network adapter 22 can also be capable of accessing a network address located such a network location as well as be configured to send and receive information to and from the second non-transitory computer-readable medium.

The processor 14 can then be configured to access and execute the set of computer instructions contained on the second non-transitory computer-readable medium 18, the processor being operable to process information sent and received over the network adapter 22. The network adapter 22 can then receive information contained on a customized database 26 which has information regarding at least a plurality of key values and a plurality of possible fields from a first non-transitory computer-readable medium 30 which can be either remotely or internally located with respect to the computer 10. In other words, the customized database can be accessed remotely through the network adapter 22 or loaded onto the internal second non-transitory computer-readable medium 18 of the computer 10 and accessed from there.

It will also be appreciated that non-transitory computer-readable mediums can be located remotely or locally and located internally or externally from the computer. The first and second non-transitory computer-readable mediums can be arranged in any suitable manner, or even be provided as a single non-transitory computer-readable medium having the capacity of performing both functions of having an executable set of computer functions as well as containing the customized database. It will be appreciated that any limitations discussed with respect to the embodiments discussed herein are not meant to be limiting in this regard, except as laid out in the claims below.

The processor 14 can then access and execute the set of computer instructions which contain at least instructions regarding how to determine the existence of various key values contained within the customized database. The computer instructions also contain instructions regarding a method of recognizing any reoccurring key component patterns within each of the various key values.

The instructions can instruct the processor 14 to disassemble the reoccurring key values into individual key components and lists each of the individual reoccurring key components thus forming a component list, the processor 14 can then be provided with instructions on how to prioritize the component list by number of reoccurrences of each individual key component thus creating a prioritized list of common components, the processor then creates a template having a field array having various possible fields, each possible field being populated with options being taken from the list of common components, the processor then selects a component from the prioritized list of common components to fill each possible field.

The processor can also search the database containing the key values and recognizes non-alphanumeric values within each key value. It will be appreciated that non-alphanumeric values often represent explicit points at which key components are separated. The processor can then split the key values at the recognized non-alphanumeric values so as to form explicit delimiters and prioritizes the explicit delimiters with respect to a number of occurrences for each explicit delimiter. The processor can record and recognize the number of times and where each explicit delimiter typically occurs with respect to other key components and prioritize the list of occurrences with respect to each of these factors.

The processor can also search the database containing the key values and recognizing where changes in symbol classifications occur in each key value. For example one classification can be a number, and another classification can be a number, and another classification can be capital letters, and another classification can be lowercase letters. The processor can recognize a change in classifications along the key value text string and split each of the key values at the recognized change in symbol classification so as to form a plurality of implicit delimiters. These implicit delimiters can be prioritized with respect to a number of occurrences for each implicit delimiter.

The instructions can also allow the processor 14 to recognize correlations between possible fields and reoccurring key component patterns determined from the various key values. The processor can then sort the reoccurring key component patterns with respect to the number of individual reoccurrences within the custom database and generate and populate a list of key component elements.

It will be appreciated that this prioritized list of key component patterns can represent potential future selections within possible fields. For example, if a particular component pattern were to reoccur in 90% of the key values contained in the customized database it would almost certainly represent a potential future selection of a key component that would form part of a new unique key value text string. Alternatively, a reoccurrence threshold could be generated to eliminate outliers from being identified as potential future selections. For example, if a particular key component only occurs a limited number of times, say once to five times in a database containing hundreds or thousands of key values, it is likely an outlier and will not be included in the prioritized list.

Based on the prioritized list filled with potential future selections, the processor 14 can use the information contained in the list in order to generate a field array representing one or more possible fields and populate a series of lists correlated to the possible field array, the series of lists containing the potential future selections correlated to each of the one or more possible fields. This field array can represent the orders in which each of the components typically occur and offer potential selections within each list based on where each key component often occurs.

It will be appreciated that the processor can also generate a list of new unique values based on recognized patterns. For example, if recognized patterns have high occurrences of particular sequences of key components followed by a sequential number, the processor can generate suggestions for future use to a user based on these particular sequences.

It will be appreciated that the user can also override or select key components outside of these generated suggestions. Alternatively, the user can also use the generated suggestions as a template and change the individual key components individually to generate a customized or tailored key value for a desired use.

The processor can transmit the newly generated unique key value pattern over the network adapter to a network address or a webpage 34 which is running a desired web analytic software 38 and the processor verifies that the web analytic software recognizes the new unique key value.

Upon finalization and selection of a new key value, the key value can be added to the customized database. Adding new key values to the customized database allows for continuous updating of the fields and prioritization of individual lists as new key values are generated. Also, adding all new key values to the customized database allows for conflict checking between new key values and already used key values such which allows for potential error checking of codes, as well as ensuring that duplicate keys are not used.

It will be appreciated that the customized database can take numerous forms, including a complex matrix with numerous columns representing various key components of a key value string, to simple lists which merely contain a list of individual and complete key value strings.

It will be appreciated that increased complexity of the customized database in one embodiment can include a plurality of columns associated with the possible fields, at least one column associated to a primary common component value, for example avenue classification can be a primary common component, i.e. SM for social media or EM for email could each be selections within the avenue classification as a primary common component. In this embodiment other columns could be associated with secondary common component values, for example, i.e. FB for Facebook™ or TW for Twitter™ could be secondary common component values to the primary common component of a social media primary common component.

Figure 2:
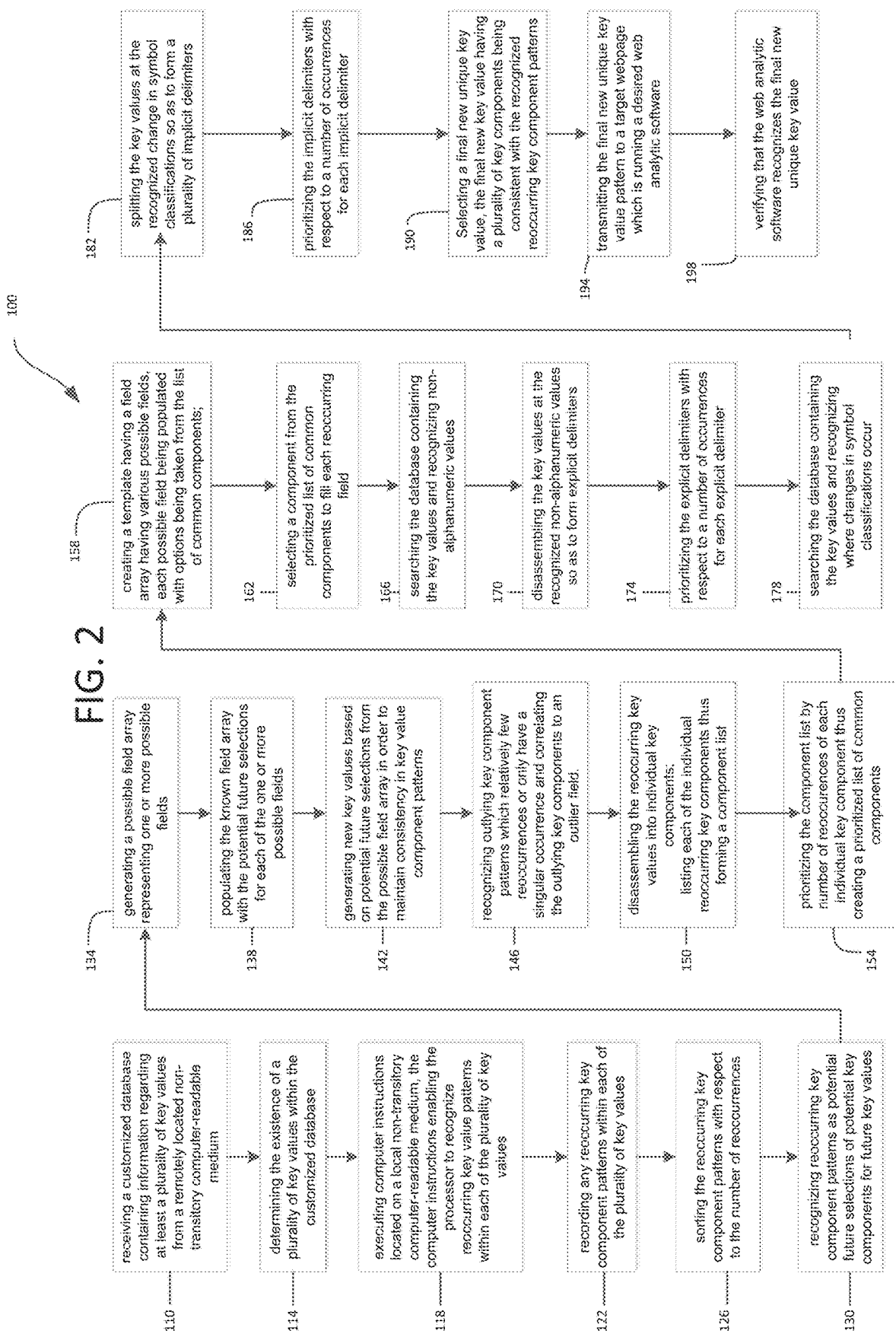
FIG. 2 illustrates a schematic showing various steps and procedures of a method in accordance with one aspect of the present invention.

In accordance with one embodiment of the present invention, a method 100 for recognizing and generating consistent identification keys, performed by at least one computer processor executing computer program instructions stored on at least one non-transitory computer-readable medium is disclosed and depicted in FIG. 2. The method 100 can include receiving a customized database containing information regarding at least a plurality of key values from a first non-transitory computer-readable medium 110. Upon receiving the customized database, a step of determining the existence of a plurality of key values within the customized database 114 can be performed. It will be appreciated that the customized database can include a plurality of columns associated with possible fields, at least one column associated to a primary common component value, and wherein other columns are associated with secondary common component values.

The processor can then perform a step including executing computer instructions located on a local non-transitory computer-readable medium 118, the computer instructions enabling the processor to recognize reoccurring key value patterns within each of the plurality of key values. Upon recognizing any reoccurring key value patterns the processor can then record each of the reoccurring key component patterns for all of the plurality of key values 122. The processor can perform another step of sorting the reoccurring key component patterns with respect to the number of reoccurrences 126.

Additionally a step including recognizing reoccurring key component patterns as potential future selections of potential key components for future key values 130 can be included in the process. In order to make better sense of the gathered key components and prepare them for future use, the method 100 can also include steps of generating a possible field array representing one or more possible fields 134 and populating the known field array with the potential future selections for each of the one or more possible fields 138.

In order to assist users in following pre-established patterns the processor can perform further steps of generating new key values based on potential future selections from the possible field array in order to maintain consistency in key value component patterns 142.

The processor can also make selection of new key components easier by performing a step of recognizing outlying key component patterns which relatively few reoccurrences or only have a singular occurrence and correlating the outlying key components to an outlier field 146.

The processor can perform additional steps to classify and sort the individual key components by performing the steps of disassembling each of the reoccurring key values into individual key components 150 as well as listing each of the individual reoccurring key components thus forming a component list 154. The component list can then be prioritized 158 by number of reoccurrences of each individual key component thus creating a prioritized list of common components. The prioritized component list can be further sorted by creating a template having a field array having various possible fields, each possible field being populated with options being taken from the list of common components 162 and the field array can be populated by selecting a component from the prioritized list of common components to fill each reoccurring field.

In order to recognize the break points or separation between each of the key components, the processor can perform identification steps. These identification steps can include searching the database containing the key values and recognizing non-alphanumeric values 166. Once the non-alphanumeric values are recognized a step of disassembling the key values at the recognized non-alphanumeric values so as to form explicit delimiters 170 can be performed. The explicit delimiters can then be prioritized with respect to a number of occurrences for each explicit delimiter 174.

Alternative break points or separation points between each of the key components can be recognized using alternative identification steps. These alternative identification steps can include searching the database containing the key values and recognizing where changes in symbol classifications occur 178 and splitting the key values at the recognized change in symbol classifications so as to form a plurality of implicit delimiters 182. Once the implicit delimiters are split, the implicit delimiters can then be prioritized with respect to a number of occurrences for each implicit delimiter 186. It will be appreciated that implicit delimiters can include recognizing a change between a numbers to a letter, a letter to a number, a number to a non-alphanumeric symbol, capital to lower-case letters, or any number of ways different characters can be distinguished between one another and classification of such distinguishing characteristics as distinct symbol classifications.

Once the individual key components are identified, the processor can generate and select a final new unique key value, the final new key value having a plurality of key components being consistent with the recognized reoccurring key component patterns 190.

In order to ensure that the final new unique key value is in the proper format, the new final new unique key value can be transmitted 194 to a target webpage or network address which is running a desired web analytic software; and the web analytic software can verify 198 that it has recognized the new unique key value.

FIG. 3 illustrates one exemplary embodiment of a customized database 200 which contains a simple list of key values 210. It will be apparent to human users that certain patterns exist within the list. For example some start with "C", and others start with "S" and some begin with "se". The computer instructions of the present invention can recognize that "S|" occurs in thirteen of the key values listed, and "C|" occurs in 7 of the key values listed. The computer instructions recognize the separation in between the "S|" and "C|" and the following component "Ban" because the symbol "|", otherwise referred to as a pipe, is an explicit delimiter. Explicit delimiters can be defined in the instructions to be any symbol, but in the embodiments shown herein are often non-alphanumeric symbols such as asterisks, hyphens, pipe symbols, forward or back-slashes, or periods.

The processor can then provide a list 214, which shows the different components and the number of occurrences. It will be appreciated that the list can be prioritized, as shown here, from most occurrences to least occurrences of each individual component.

Further the processor can also save the relative locations of each of the key components with respect to one another and build suggested future selections or templates 218 which can be used for building future key values which assist the user in following pre-established patterns.

Figure 4A:
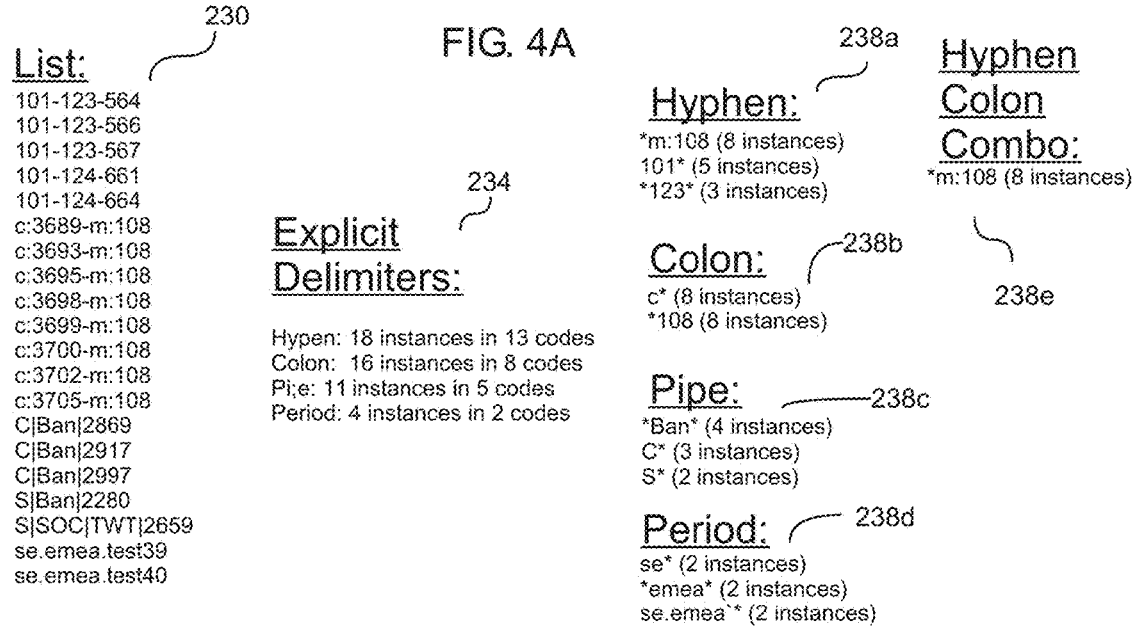
FIGS. 4A-B illustrate exemplary embodiments of customized databases containing a plurality of key values and how they can be disassembled according to implicit and explicit delimiters.

FIG. 4A illustrates a list of key values 230 which illustrates how key values can be disassembled using additional explicit delimiters. The explicit delimiters are listed in explicit delimiter list 234, and the explicit delimiters are further categorized in lists 238*a-e* in a way that shows their relative locations with regard to other key components.

Figure 4B:
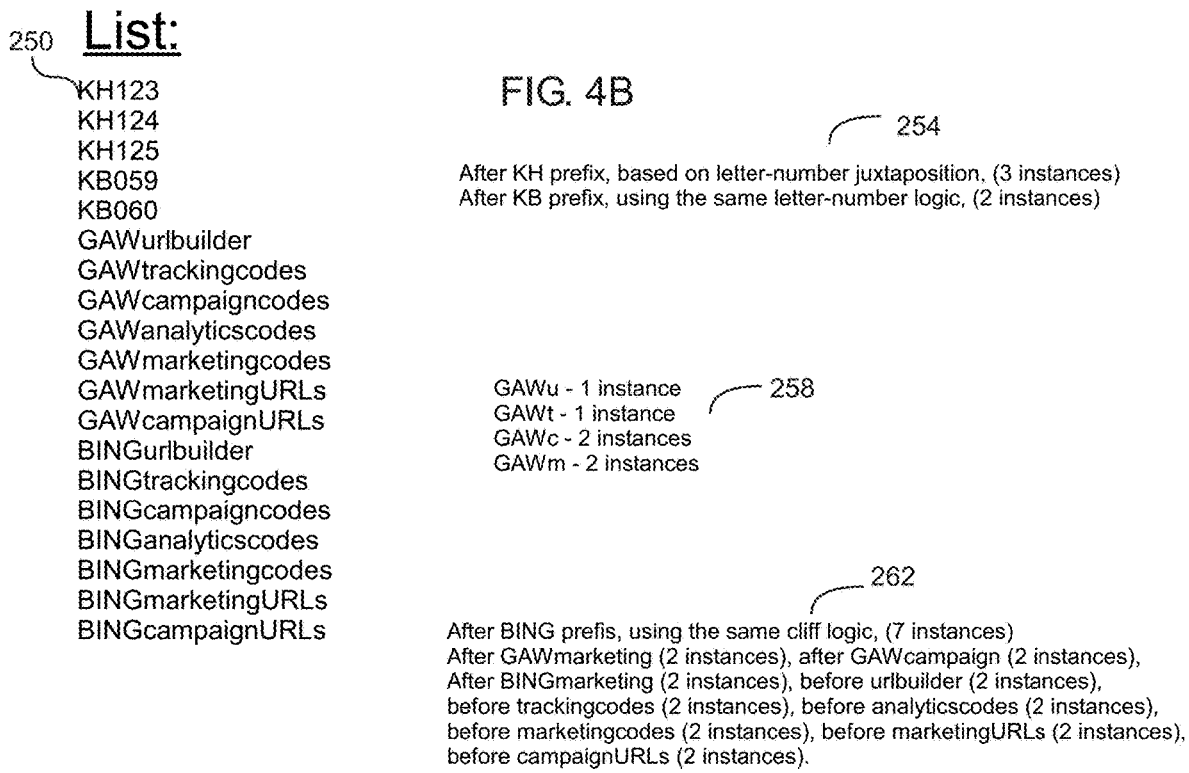

FIG. 4B illustrates a list of key values 250 which illustrates how a list of key values can be disassembled using implicit delimiters. It will be appreciated that various different implicit delimiter logics are being used in this exemplary embodiment. One logic is that the computer instructions are instructing the processor to recognize where the text strings change from capital letters to lower case letters. Another logic is to recognize where changes between letters and numbers occur. Yet another logic is to recognize where similarity cliffs occur. A similarity cliff is illustrated by list 258, where some similarity is recognized beyond the change in capital letters to lower case letters. For example, GAWc and GAWm both occur twice, after which only single occurrences, or individual outliers exist. This is one example where a threshold can be implemented and a certain number of repetitions or a certain percentage of key values must contain a component prior to the component being included in the list of potential future selections. By requiring a certain percentage or number of existences of each key component, outliers, which might represent previous codes with syntax errors can be eliminated and bring better consistency to the generated templates or suggested formats generated from data contained within the customized database.

FIG. 5 illustrates a customized database in the form of a field array or a matrix 300. It will be appreciated that the first column 310 contains a list of complete key values, and the first row 314 of each column contains a description regarding the contents of each of the columns. These descriptions can also be referred to herein as primary or secondary key component values, 318 and 322 respectively and can describe various pieces of data that the user wishes to track. In this particular embodiment, the user is interested in the effectiveness of different sized banner ads, and the business types that they are advertised with.

The computer instructions can be configured so as to instruct the processor to recognize correlations between certain key components and corresponding fields in the matrix of the customized database. For example |Ban| occurs in every key value in the list, and Banner Ad occurs in every cell under media type. Using this information, the processor can be instructed to associate |Ban| with Banner Ad in the Media Type column, and when the processor generates a field array representing potential future key component selections, when the user selects that the link is going to be used in conjunction with a banner ad, the processor can automatically fill in the media type column and include the |Ban| component in its proper corresponding spot.

FIG. 6 illustrates a portion of a possible field array 400 representing one or more possible fields generated from the key component patterns detected from the customized database of FIG. 5. FIG. 6 also illustrates how a drop-down 410 of potential field values can be presented to the user, or key value generator. The processor in this embodiment has recognized several banner ad sizes and associated key component values associated with those sizes. Upon selection of the desired size, each of the fields which have values correlated to that particular selection can be filtered to reduce the selection pool to only present suitable matches, and in the case where the selection is filtered to a single selection, the cell can be auto-populated.

The processor can then keep track of the selections for each of the various field values and generate a new key value template which will have key components associated with each of the selected field values. The new key value template can then be customized or further completed by the user to fill in the gaps that either could not be fully predicted by the processor, or further selection is necessary.

The computer processor can also indicate fields which need further narrowing or filling in by the user. For each of the indicated fields the processor can also offer suggestions regarding what values would be appropriate for a given field, based upon the recognized patters. For example, while no specific character pattern might have been recognized, the characters might fit into a particular classification, such as symbols or letters. For such fields the processor can suggest auto numbers or some other potential series of another classification to the user. For such instances, the processor can generate suggestions and auto check to ensure such sequences have not been used in the past and thus avoid conflicts.

It will be appreciated that once a final key value is selected that the user can indicate a landing page, or other network address which is running the desired web analytical software for which the key value is written. The processor can execute a verifying tool which is operable to send the key code to the landing page and verify which key components are recognized and which are missing or otherwise unrecognized. The processor can then indicate success or alternatively generate warnings or otherwise indicate to the user which components were not recognized prior to using the key value, for example, in an actual advertisement.

The system and method can also utilize a set of computer instructions that allows the processor to perform a verification step. The verification step can provide additional information and verification beyond merely ensuring that the link with the embedded key value is correctly formed. For example the verifying step can visit and ensure that the landing page exists, as well as verify that the landing page has been properly configured so as to relay key value information back to the user's analytics tracking systems, i.e. customized database. This verification can be performed by opening the link and sending the key value to the desired web analytic software running on the target page. The verifier can open scripts created by the web analytic software in response to the key values and track each of the key components which are recognized by the web analytic software. The verification step can then create warnings or errors for any key components which are not recognized and attach a notification to each key component. The verifying tool can also be configured to ensure that the proper fields within the customized database are being populated so as to ensure that any reports generated off the customized database are accurate.

FIG. 7 illustrates a flow chart which depicts each of the functions and decisions performed by the system and method as viewed by an end user 500. The User selects a desired pattern type and is first shown a fields table correlating to the desired pattern 510, wherein the fields table is populated with fields recognized from the custom database by the processor. It will be appreciated that some of the fields can have one or more possible values within each field, or some fields can have only one possible selection, and can be prefilled. The processor can then create a series of tracking codes or templates automatically 512 which are consistent with established patterns for the chosen pattern type. Based on the desired pattern type, fields which do not correspond to the selected pattern type can be hidden 514. The templates can also be prefilled with as much known information as possible based on the recognized patterns 516. Drop-down lists can then be generated 518 based on known possible selections when more than one possible key component for a specific filed exists.

In certain cases selection of certain key components can be described as a table field where selection of one key component for a given field can have correlations which constrain the selection of other components, or such a table filed can have embedded information not included as a key component. In one embodiment such cases this embedded information can include additional variables such as date or titles that can fill patterns in the customized database, but do not have corresponding key component values for the key value. In such a case such table fields can be included in the drop-down lists 520.

It will also be appreciated that often times, new key values can be generated that have additional key components or the user may desire to add additional key components not already recognized in the custom database. For such eventualities a custom library or system field can be included in the fields table 522. Custom, library, or system fields can be independently filled by the user and used to add additional key components and associated fields to the custom database and recognized for future use and pattern consistency.

The Table can then be displayed to the user having a customized or finalized key value code in place which is ready for the user to engage or otherwise use in a traceable link.

It will be appreciated that many situations can present themselves wherein a series of new unique key value codes might need to be created for numerous related applications. In such a case, the user might have a similar ad to be provided in several related applications, and therefore need to create numerous unique but consistent key codes for each related application. In such an instance, the user can select additional rows below the first key value code in the fields table 526. When the user selects additional rows the same table logic applied by earlier selections can be applied to the rows below, but offer, for example, a sequential number identifier to ensure each key value code is unique one from another, while maintaining a consistent pattern between each key value code.

Each of the codes can then be presented to the user and offer the chance to verify or make any desired changes; then the key value codes can be submitted 528. The processor can then check for any missing values, or inconsistencies in crucial fields. Any such inconsistencies or missing values can then be highlighted and attach a warning message to each instance 530. The processor can then check for any clear errors 532, and if any clear errors exist the processor can return the user to box 528 and require the user to correct the errors. If no clear errors are present then the processor verifies or checks for inconsistency warnings 534. The warning messages are then presented to the user and the user can either ignore them and confirm and submit the key value code 536 at which point the table data will be accepted, and the key value code can be added to the customized database and later used in the desired traceable link 538. Alternatively the user can choose to address the warnings and returned to box 528 iteratively until either no warnings are present or the user ignores any remaining warnings.

It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for recognizing and generating consistent identification keys, comprising:

a first non-transitory computer-readable medium containing at least one executable set of computer instructions capable of detecting patterns within text strings;

a network adapter capable of accessing the internet as well as being capable of access network address located thereon, the network adapter being configured to send and receive information to and from the first non-transitory computer-readable medium;

a processor configured to access and execute the set of computer instructions contained on a second non-transitory computer-readable medium, the processor being operable to process information sent and received over the network adapter;

wherein the network adapter receives a customized database containing information regarding at least a plurality of key values and a plurality of possible fields from the first non-transitory computer-readable medium;

wherein the processor determines the reoccurrence of various key value patterns within the customized database;

wherein the processor recognizes any reoccurring key component patterns within each of the various key values;

wherein the processor recognizes correlations between possible fields and reoccurring key component patterns determined from the various key values;

wherein the processor sorts the reoccurring key component patterns with respect to the number of reoccurrences and populates a list of key component elements;

wherein the processor recognizes reoccurring key component patterns as potential future selections within possible fields;

wherein the processor generates a possible field array representing a plurality of possible fields, each field of the plurality of possible fields representing one or more potential key components;

wherein the processor populates the possible field array with the potential future selections for each of the possible fields, the possible field array containing the potential future selections correlated to each of the possible fields;

wherein the processor presents to a user the plurality of possible fields;

wherein the processor receives from the user a plurality of selections from the presented plurality of possible fields; and wherein the processor is configured to generate a customized key value based on the plurality of selections from the user;

wherein the processor disassembles the reoccurring key values into individual key components and lists each of the individual reoccurring key components thus forming a component list, wherein the processor then prioritizes the component list by number of reoccurrences of each individual key component thus creating a prioritized list of common components, wherein the processor then creates a template having a field array having various possible fields, each possible field being populated with options being taken from the list of common components, and then the processor selects a component from the prioritized list of common components to fill each reoccurring field;

wherein the customized database includes a plurality of columns associated with possible fields, at least one column associated to a primary common component value, and wherein other columns are associated with secondary common component values;

wherein the processor searches the database containing the key values and recognizes non-alphanumeric values within each key value, the processor then splits the key values at the recognized non-alphanumeric values so as to form explicit delimiters and prioritizes the explicit delimiters with respect to a number of occurrences for each explicit delimiter;

wherein the processor searches the database containing the key values and recognizing where changes in symbol classifications occur in each key value, the processor then splits each of the key values at the recognized change in symbol classifications so as to form a plurality of implicit delimiters and prioritizes the implicit delimiters with respect to a number of occurrences for each implicit delimiter;

wherein the implicit delimiters are recognized based on the change between symbol classifications, where at least one symbol classification is classified as a number and at least one other symbol classification is classified as a letter;

wherein the processor generates at least one new unique key value, the new unique key value being formed of components consistent with the recognized key component patterns; and wherein the processor transmits the new unique key value pattern over the network adapter to a network address having a webpage which is running a desired web analytic software and the processor verifies that the web analytic software recognizes the new unique key value.

* * * * *